Patented Sept. 22, 1953

2,653,172

UNITED STATES PATENT OFFICE 2,653,172

STABILIZATION OF ACROLEIN

Harvey L. Parry, Berkeley, Calif., assignor to Shell Development Company, San Francisco, Calif., a corporation of Delaware No Drawing. Application June 22, 1948, Serial No. 34,562

5 Claims. (Cl. 260—601)

This invention relates to a new and improved method for the stabilization of unsaturated aliphatic aldehydes. More particularly, the present invention relates to a new and improved method for the stabilization of acrolein against autopolymerization such as is induced by conditions encountered in usual transportation and storage, and in refinement and similar treatments of acrolein. The invention also pertains to novel combinations of matter obtained according to the practice of the method of the invention.

Acrolein, the unsaturated aldehyde of the formula $H_2C=CH-CHO$, is known to be an organic chemical useful in organic syntheses. It also may be used advantageously as a polymerizable organic compound for the preparation of various resins or polymers and co-polymers. It will be seen to be the lowest member of the broad class of unsaturated aliphatic aldehydes. Not unlike lowest members of other homologous series or classes of organic compounds, acrolein is known to possess inherent characteristics which sharply differentiate it in various respects from the higher members of the class, to and even including its adjacent higher homologs. Acrolein, when pure, spontaneously polymerizes, and even freshly purified acrolein can be stored only for a brief time (frequently only a matter of minutes and at the most, hours) before formation of polymers becomes evident. The rate of autopolymerization is greatly accelerated by increased temperatures, other conditions being equal, hence, the formation of polymers is particularly difficult to avoid at temperatures substantially higher than, say, ordinary room temperatures. Although exposure of acrolein to light and air has been observed to increase the rate of formation of autopolymers, the exclusion of light and air does not entirely prevent the polymerization. The polymers that are thus spontaneously formed are generally substantially insoluble in acrolein. Their formation usually is first evidenced by the development of a cloudiness or haziness in the liquid acrolein, and as the polymerization progresses solid precipitates of polymers settle out, the acrolein eventually being completely converted to polymeric material. The precipitated solid is especially obnoxious because it clings tenaciously to metal and like surfaces and is insoluble in most common solvents. The formation of the polymer, therefore, not only results in the obvious loss of acrolein and decreased quality of the residual material, but the polymer also contaminates the surfaces of, for example, storage vessels, conduits through which acrolein is conveyed, and equipment used as in the refining or other treatment of acrolein, with the result that such surfaces become fouled and, in particular, difficult to clean. In, for example, heat exchangers, conduits, stills and condensers, and like chemical equipment, the fouling of the surfaces can become a very serious matter because of the resulting impaired efficiency of the equipment. In such cases, the problem is further aggravated by the frequent inaccessibility of the fouled surfaces for cleaning.

While it has been suggested that the incorporation of various materials with acrolein may reduce the spontaneous formation of insoluble polymers, the heretofore known methods have not adequately solved the problem that is involved. In order to obtain even a reasonable degree of stability it may be necessary to add such an amount of the known polymerization inhibitors that their presence materially reduces the quality, i. e., the purity of the acrolein. Furthermore, the cost is excessive due to the expense of compounds heretofore generally used for stabilizing acrolein. On the other hand, if the amount of polymerization inhibitor incorporated according to the prior art methods for stabilizing acrolein is limited to an amount that does not undesirably contaminate the acrolein, or if economic savings are attempted by using reduced amounts of the polymerization inhibitors, the autopolymerization generally will be inhibited to such a slight degree that it remains a serious problem, as described hereinabove. It is particularly desirable to obtain a method of stabilizing acrolein against autopolymerization at relatively elevated temperatures, such as temperatures near and above its atmospheric boiling point, such as above about 40° C., and it is at these elevated temperatures that the heretofore known methods are particularly inadequate.

One of the objects of the present invention is a new and improved method for stabilizing acrolein against autopolymerization. Another important object of the invention is a method of handling acrolein, as in storage vessels, chemical equipment, and the like, to prevent for practical purposes formation of polymer therein. Another object of the invention is a method for the stabilization of liquid acrolein that is more effective than the heretofore known methods, and that in particular is highly effective at elevated temperatures, especially at temperatures approaching and even exceeding the atmospheric boiling temperature of acrolein. New combinations of matter comprising the stabilized acrolein are further objects of the invention. Other objects of the invention will be apparent herein.

It has been discovered in accordance with the invention that metallic copper and phenolic antioxidants co-act to exert in the presence of traces of water, a truly remarkable synergistic action to render acrolein stable against autopolymerization. It has been found that by incorporating a minute amount of phenolic antioxidant, such as hydroquinone, with acrolein and maintaining the mixture in contact with copper metal or a copper-containing alloy in the presence of water, the rate of polymer formation may be decreased by a factor as great as one hundred or more taken with respect to the stability of the same composition in the absence of copper. The synergistic nature of the action is further shown by the fact that metallic copper, without incorporation of the phenolic antioxidant with the acrolein, is for practical purposes ineffective for stabilizing the acrolein, whether or not water is present.

The following representative experiment will illustrate the nature of the results thus referred to.

EXAMPLE 1

Acrolein was prepared by oxidizing propylene in the presence of cuprous oxide catalyst, according to the method disclosed and claimed by Hearne and Adams in their pending application Serial No. 776,616, filed September 27, 1947, now U. S. Patent No. 2,451,485. The crude product from the reactor was collected and fractionally distilled, the fraction boiling from 52.4° C. to 52.5° C. (760 mm. Hg pressure) being collected. The collected fraction contained, by analysis, 2.7% water and 1.5% saturated $C_3$ carbonylics (acetone and propionaldehyde) and analyzed (by analysis for acrolein) 95.5% pure acrolein.

For the experiments, test samples were made up by flash distilling a measured amount of the fraction described above into a glass flask containing the desired quantity of hydroquinone (if any), and thoroughly mixing to dissolve the hydroquinone. From the flask, 25 cc. aliquots were transferred to glass ampoules. Each experiment was run in quadruplicate. Copper, if to be present in the particular test, was added to the ampoules in the form of copper filings or copper powder. Air in the ampoules was displaced by nitrogen, the ampoules were sealed, and immersed in a water bath maintained at 60±0.2° C. Light was excluded by enclosing the ampoules in metal containers. Five minutes' time was allowed for the ampoules to reach the bath temperature; then they were examined by diffused daylight at suitable intervals to detect the first appearance of visible cloud or haziness. In some cases at the conclusion of the experiment, total polymer was determined by removing the copper, centrifuging the ampoules and decanting the supernatant liquid, and weighing the residue (polymer).

When tested in this manner the collected fraction described above, without addition of any other substance, formed a visible cloud of polymer in less than 5 minutes at 60° C. After 24 hours at 60° C., 2.5% polymer, based on acrolein, was found to have formed.

Further portions of the same fraction, containing 0.01% hydroquinone, formed a visible cloud of polymer in 30 minutes to 3 hours (in different ampoules) and were found to contain from about 0.5% to 1.8% polymer after 24 hours at 60° C.

Still further portions of the same fraction containing 0.01 gram of copper filings per gram of acrolein, but no other added material, formed a visible cloud of polymer in 6 minutes at 60° C., and after 24 hours contained 3.1% polymer.

Further portions of the collected fraction, containing 0.01% hydroquinone and in addition thereto 0.018 gram of copper filings per gram of acrolein, contained no visible trace of polymer after 9 days at 60° C., at which time the experiment was discontinued. No polymer separated upon centrifugation of the sample after this time. In another experiment, a sample of the fraction containing 0.005% hydroquinone and copper filings was held at 60° C. for 42 days and found at the end of this time to contain no visible trace of polymer.

Further illustrative examples of the invention appear below:

EXAMPLE II

These experiments were designed to determine the comparative effects of the presence of a phenolic antioxidant (hydroquinone), copper or a copper-containing alloy, and water, individually and together, upon the stability of acrolein. The test method described in Example I was used. In the following table, the compositions tested are shown, and their stabilities, determined by observation of the time required for development of a visible haze or precipitate of polymer, are given. All of the stability determinations were at 60±0.2° C. The column headed "Stability, Cloud Time" contains the lengths of time at 60° C. until visible formation of insoluble polymers.

TABLE I

*Stability of acrolein in the presence of water, phenolic antioxidants, and copper metals*

A. EFFECT OF WATER ALONE

| Materials Present, by weight of acrolein | | | | Stability, Cloud Time |
|---|---|---|---|---|
| Hydroquinone | Copper Filings | Brass Turnings | Water | |
| None | none | none | 0.0% | <5 minutes. |
| Do | do | do | 2.7% | Do. |

B. EFFECT OF COPPER METALS, IN THE PRESENCE OF WATER

| | | | | |
|---|---|---|---|---|
| none | 1% | none | 2.7% | 6 minutes. |

C. EFFECT OF HYDROQUINONE, IN THE PRESENCE AND IN THE ABSENCE OF WATER

| | | | | |
|---|---|---|---|---|
| 0.005% | none | none | 0.0% | 20 minutes. |
| 0.005% | do | do | 2.7% | 35 minutes. |
| 0.01% | do | do | 2.7% | 0.5–3 hours. |

D. EFFECT OF HYDROQUINONE AND COPPER METALS, IN THE PRESENCE AND IN THE ABSENCE OF WATER

| | | | | |
|---|---|---|---|---|
| 0.01% | 1% | none | 0.0% | 36 minutes. |
| 0.01% | none | 2.2% | 0.0% | 54 minutes. |
| 0.01% | 1.8% | none | 2.7% | >9 days.[1] |
| 0.01% | none | 5.1% | 2.7% | 4 days. |
| 0.005% | 1% | none | 2.7% | >42 days.[1] |

[1] Observations discontinued at indicated time.

In lieu of the hydroquinone specifically illustrated in the above experiments, there may be employed other compounds of the class generally known as the phenolic compounds, or the phenolic antioxidants, that is, the homologs and substitution products of the simplest member of the class, namely, phenol, as well as phenol itself.

The phenolic compound may be either monohydric or polyhydric. Thus, the phenolic compound may contain only one or it may contain more than one hydroxyl group directly linked to the aromatic, or aryl, radical. The polyhydric phenols are especially suited to the objects of the invention. Other hydrogen atoms of the aromatic compound may be replaced by suitable organic or inorganic substituents. In addition to hydroquinone, the following non-exclusive group of phenolic antioxidants may be mentioned: phenol, the cresols, the naphthols, the anthrols, the xylenols, cumenol, carracrol, thymol, eugenol, catechol, resorcinol, orcinol, guaiacol, p-tert-butyl catechol, quintol, pyrogallol, phloroglucinol, and the like and their homologs and analogs and substitution products.

An advantage of the invention is that it permits the use of the phenolic compounds in amounts far below the amounts heretofore employed and regarded as necessary in general practice. For example, as little as 0.0001% of the phenolic compound and a copper metal exert in the presence of water an appreciable stabilizing action. Generally from about 0.001% to about 0.02% of the phenolic compound may be incorporated with the acrolein. Even larger amounts may be used if desired, up to say 5%, or even 10% of the phenolic compound. However, amounts from about 0.005% to about 1% of the phenolic compound ordinarily will be found to impart, in conjunction with the copper, a stability sufficient for even the most rigorous conditions liable to be encountered. When, as above, the amount of the phenolic compound is indicated in terms of percentages, weight per cent based on the amount of the acrolein, is meant.

The use of, for example, hydroquinone alone to impart a moderate stability to acrolein is, of course, well known since the discovery by Moureu of its stabilizing action upon acrolein. Any of the customary methods for incorporating the hydroquinone or other phenolic antioxidant with the acrolein may be employed in the practice of the present invention. No claim is made to the use of hydroquinone or other phenolic antioxidants alone to stabilize acrolein. The invention is based upon the hitherto unknown synergistic action of copper metals with such phenolic antioxidants in the stabilization of acrolein, and the novel method of stabilizing acrolein based upon such synergistic action.

The presence of at least a small amount of water dissolved in the acrolein has been found to be essential for the synergistic action upon which the invention is based. There preferably should be present at least 0.1% of water, based upon the weight of the acrolein, and more desirably there will be present at least about 1% of water. A desirable maximum amount of water is about 10%, based upon the weight of the acrolein, and a preferred maximum is about 5%, based upon the weight of the acrolein. Less desirably, larger amounts of water, up to and even exceeding the solubility limit of water in acrolein, may be present. Acrolein, obtained, for example, by distillation of a crude hydrous product, may contain sufficient water carried over in the distillation so that addition of further amounts of water is not required. If the acrolein that is to be stabilized according to the invention is anhydrous, water in a suitable amount may be added thereto.

While pure copper metal may be employed most efficaciously as the copper metal, other metals or alloys containing copper, may be employed in the practice of the method of the invention. Alloys of copper with one or more other metals, such as with one or a plurality of zinc, lead, tin, nickel, aluminum, chromium, manganese, and beryllium are included. The alloy, if an alloy is used in place of pure copper, should contain more than 50% of copper, and most desirably is one that contains not less than about 65% copper. Suitable copper-containing alloys include, among others, tin bronzes, high lead tin bronzes, leaded red brasses, yellow brasses, such as manganese bronze, yellow brass (SAE No. 41), aluminum bronzes, commercial bronze, red brass (SAE Nos. 74 and 79A), SAE No. 79B low brass, SAE Nos. 70A and 74 cartridge brass, forging brass (SAE No. 88), admiralty metal, phosphor bronze, and copper silicon alloy. The copper or copper-containing alloy may be used in the form of powder, filings, turnings, screen, wire, sheet, sponge, foil, tubing, or other forms of regular or irregular contour.

In the practice of the method of the invention, liquid acrolein containing a phenolic antioxidant is maintained in contact with a copper metal, whereby formation of undesired polymers is substantially precluded. For example, for storage and transportation purposes, pieces of copper metal may be placed in the storage vessel and acrolein containing hydroquinone or other suitable phenolic antioxidant and a small amount of water stored in contact therewith. Or the container itself may be formed from a copper or a suitable copper alloy, or at least its inner surface or a part thereof may be copper or a suitable copper alloy. With chemical equipment, pieces of copper or copper-containing alloy may be positioned suitably within the equipment in contact with liquid acrolein therein, or the equipment may be constructed with at least the surfaces thereof, or a part thereof, that are to be contacted with the liquid acrolein composed of a copper metal. For example, the efficiency of heat exchangers used in cooling or heating liquid acrolein, or piping through which warm acrolein is conveyed, when constructed of iron or steel, will be materially reduced after an undesirably short period of use because the surfaces in contact with the acrolein will be coated with a film or layer of polymeric material, even though hydroquinone or other phenolic antioxidant and water may have been added to the acrolein. If, however, at least the surfaces of such equipment in contact with the acrolein are composed of copper or a suitable copper-containing alloy, and there is provided in the acrolein a minute amount of, say, hydroquinone and water, the formation of such polymer coatings will be substantially prevented, materially increasing the efficiency of the equipment.

The present invention will be seen to provide a simple and easily applicable method for stabilizing acrolein against the formation of insoluble products of autopolymerization. The method of the invention also will be seen to completely prevent the formation of such autopolymers under conditions and for times that frequently may be encountered in the industrial production and utilization of acrolein.

I claim as my invention:

1. The method of stabilizing acrolein in liquid state against autopolymerization, which comprises incorporating with acrolein water in an amount at least 0.1% by weight of the acrolein but not exceeding the solubility limit of water in acrolein, hydroquinone in an amount from about 0.0001% to about 5%, based upon the weight of the acrolein, and maintaining the acrolein containing the water and the hydroquinone in contact with a copper metal having a copper content greater than 50%.

2. The method of stabilizing acrolein in liquid state against the formation of autopolymers occurring at temperatures in excess of about 40° C., which comprises providing a water content therein from about 1% to about 10%, based upon the weight of the acrolein, incorporating with the acrolein hydroquinone in an amount from about 0.001% to about 10%, based upon the weight of the acrolein, and maintaining the acrolein containing the water and the hydroquinone in contact with a copper metal during such time that it is exposed to temperatures in excess of about 40° C., said copper metal having a copper content greater than 50%.

3. The method of stabilizing acrolein in liquid state against autopolymerization which comprises, providing in the acrolein a water content from about 1% to about 5%, based upon the weight of the acrolein, incorporating with the acrolein from about 0.005% to about 1% of its weight of a polyhydric phenol, and maintaining the acrolein containing the polyhydric phenol and the water in contact with copper metal.

4. The method of stabilizing acrolein in liquid state against autopolymerization which comprises, providing therein a water content from about 1% to about 10%, based upon the weight of the acrolein, incorporating with the acrolein an amount of a polyhydric phenol corresponding to from about 0.001% to about 1%, based upon the weight of the acrolein, and maintaining the acrolein containing the water and the polyhydric phenol in contact with a copper alloy having a copper content greater than 50%.

5. The method of conveying liquid acrolein from one point to another which comprises, providing in the acrolein a small concentration, between about 0.1% and about 10% by weight, of water and from about 0.0001% to about 10% by weight of a polyhydric phenol and conveying the mixture through a conduit, the inner surface of which is formed at least in part of a copper metal having a copper content greater than 50%.

HARVEY L. PARRY.

References Cited in the file of this patent

UNITED STATES PATENTS

| Number | Name | Date |
|---|---|---|
| 1,436,047 | Moureu | Nov. 21, 1922 |
| 2,150,158 | Gallagher et al. | Mar. 14, 1939 |
| 2,212,894 | Allen | Aug. 27, 1940 |
| 2,277,887 | Schulz et al. | Mar. 31, 1942 |
| 2,402,133 | Gresham et al. | June 18, 1946 |